(12) United States Patent
Lei et al.

(10) Patent No.: US 10,050,496 B2
(45) Date of Patent: Aug. 14, 2018

(54) INDUCED DRAFT FAN

(71) Applicant: Zhongshan Broad-Ocean Motor Co., Ltd., Zhongshan (CN)

(72) Inventors: Wei Lei, Zhongshan (CN); Wenqing Bian, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 1021 days.

(21) Appl. No.: 14/306,205

(22) Filed: Jun. 16, 2014

(65) Prior Publication Data

US 2015/0022063 A1 Jan. 22, 2015

(30) Foreign Application Priority Data

Jul. 17, 2013 (CN) .................... 2013 2 0426987 U (51) Int. Cl.
*H02K 11/00* (2016.01)
*H02K 29/08* (2006.01)
*H02K 7/14* (2006.01)
*F04D 25/06* (2006.01)
*H02K 11/33* (2016.01)

(52) U.S. Cl.
CPC ..... *H02K 11/0073* (2013.01); *F04D 25/0606* (2013.01); *H02K 7/14* (2013.01); *H02K 11/33* (2016.01); *H02K 29/08* (2013.01)

(58) Field of Classification Search
CPC .... H02K 11/0073; H02K 11/33; H02K 29/08; H02K 7/14; H02K 11/00; F04D 25/0606
USPC .............. 310/68 R, 62, 63, 67 R, 71, 89, 91; 290/38 R, 39, 40 A
See application file for complete search history.

(56) References Cited

U.S. PATENT DOCUMENTS

| | | | | |
|---|---|---|---|---|
| 2,870,356 A * | 1/1959 | Gibson | .................... | H02K 5/15 29/609 |
| 4,773,829 A * | 9/1988 | Vettori | .................... | H02K 7/14 310/68 R |
| 4,883,982 A * | 11/1989 | Forbes | .................... | F04D 25/08 310/156.26 |
| 5,119,466 A * | 6/1992 | Suzuki | .................... | H02K 9/22 310/68 R |
| 5,394,041 A * | 2/1995 | Oberdorfer-Bogel | .... | A47L 5/22 310/156.22 |
| 6,042,513 A * | 3/2000 | Koteles | .................. | A63B 24/00 318/1 |

(Continued)

*Primary Examiner* — Bernard Rojas
*Assistant Examiner* — Ahmed Elnakib
(74) *Attorney, Agent, or Firm* — Matthias Scholl, PC; Matthias Scholl (57) ABSTRACT

An induced draft fan, including: a housing, a wind wheel, an AC motor, and a controller. The controller includes: an AC-DC conversion circuit, a microprocessor, a Hall sensor, a drive circuit, and a relay. The input end of the AC-DC conversion circuit is connected to an external AC input, and the output end of the AC-DC conversion circuit supplies a DC current to each circuit part. The input end of the relay is connected to the external AC input, and the output end of the relay supplies power for corresponding parts. A magnetic ring is disposed on a rotating shaft of the AC motor. The Hall sensor is disposed close to the magnetic ring for detecting a signal of a rotational speed of the AC motor and inputting the signal of the rotational speed into the microprocessor. The microprocessor controls energization or deenergization of the relay.

16 Claims, 9 Drawing Sheets

(56) References Cited

U.S. PATENT DOCUMENTS

| | | | | |
|---|---|---|---|---|
| 6,140,782 A | * | 10/2000 | Chin | H02P 6/08 318/400.26 |
| 6,297,572 B1 | * | 10/2001 | Sunaga | H02K 11/33 310/64 |
| 6,534,946 B2 | * | 3/2003 | Lelkes | H02P 1/46 310/67 R |
| 2007/0281824 A1 | * | 12/2007 | Tezuka | G01D 5/04 475/331 |
| 2008/0116829 A1 | * | 5/2008 | Gerfast | H02P 6/182 318/400.11 |
| 2012/0032624 A1 | * | 2/2012 | Peterson | H02P 23/0077 318/479 |
| 2013/0216377 A1 | * | 8/2013 | Wang | F04D 29/102 415/230 |

* cited by examiner

INDUCED DRAFT FAN

CROSS-REFERENCE TO RELATED APPLICATIONS

Pursuant to 35 U.S.C. § 119 and the Paris Convention Treaty, this application claims the benefit of Chinese Patent Application No. 201320426987.4 filed Jul. 17, 2013, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

Field of the Invention

The invention relates to an induced draft fan.

Description of the Related Art

Figure 1:
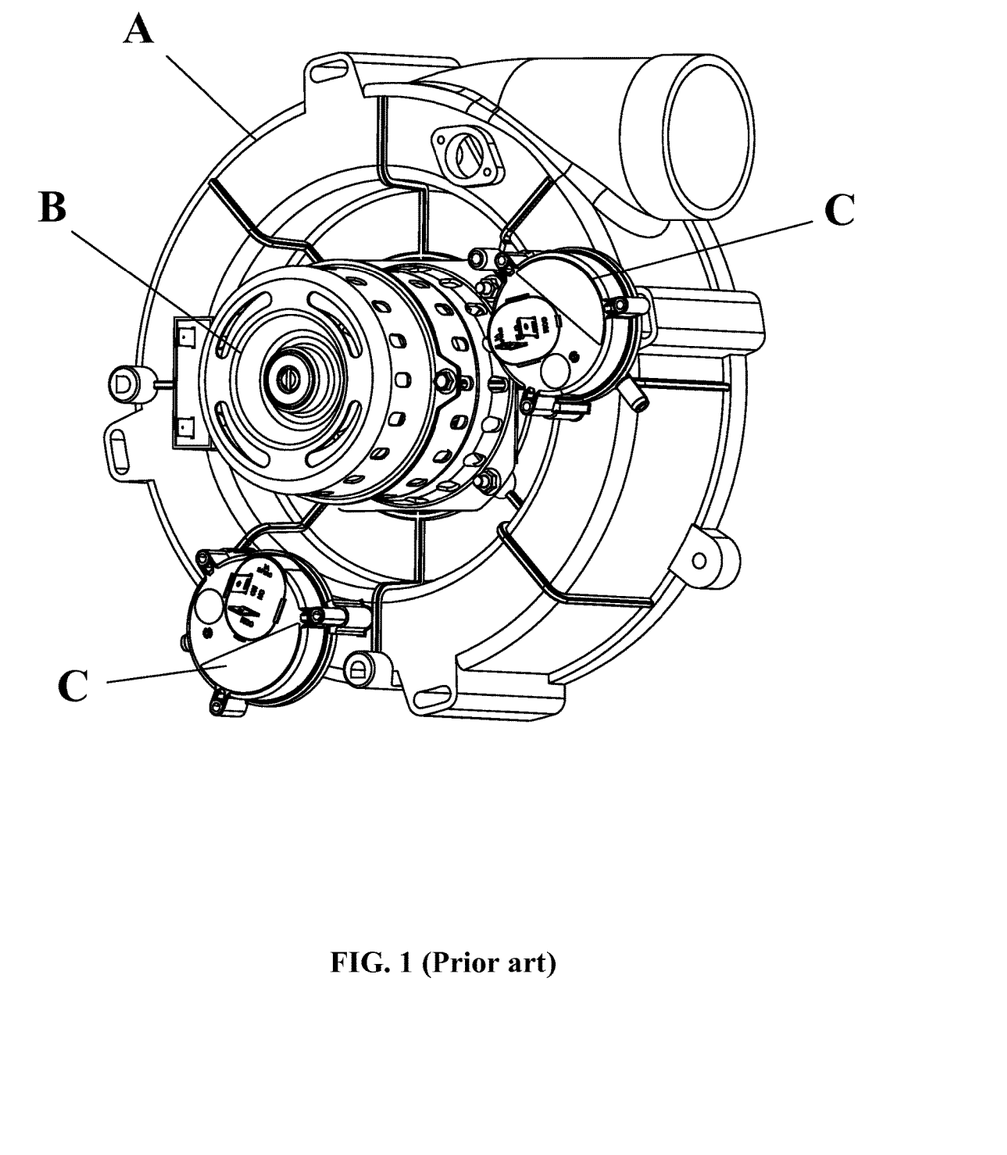
FIG. 1 is a stereogram of a typical induced draft fan in accordance with one embodiment of the invention.
Figure 2:
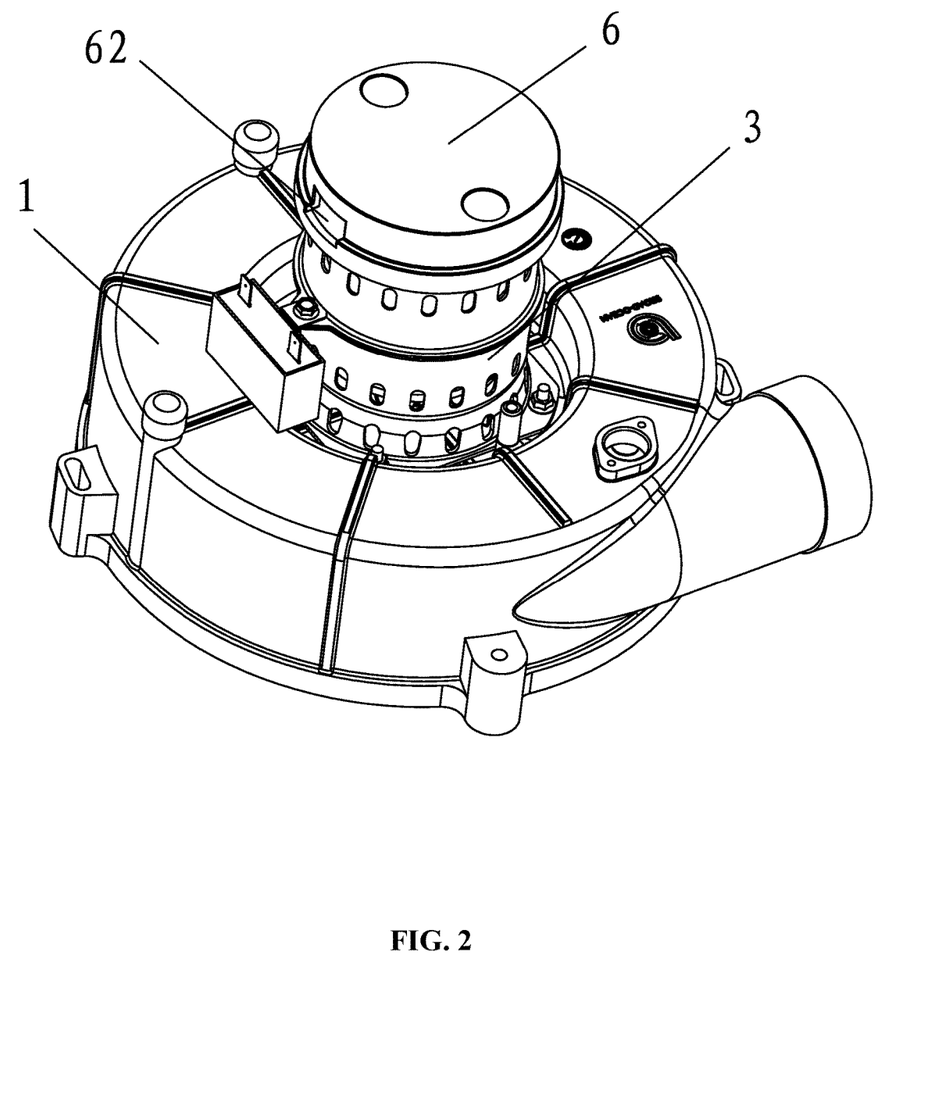
FIG. 2 is a stereogram of an induced draft fan in accordance with one embodiment of the invention.

A typical induced draft fan system, as shown in FIG. 1, includes: a housing A, a wind wheel, and an AC motor B. The housing A is provided with an air inlet, an air outlet, and an inner cavity for accommodating the wind wheel. The air inlet and the air outlet communicate with the inner cavity. The AC motor B is disposed on the housing A. A front end part of a rotating shaft of the AC motor B protrudes inside the inner cavity and is connected to the wind wheel. An air switch C (a negative pressure switch for measuring the air pressure inside the inner cavity) is mounted on the housing A for detecting whether the induced draft fan is started. Such an induced draft fan system utilizes the air switch to measure the pressure therein to conduct the starting and closing movements. The air switch, however, is easily influenced by multiple factors and thus has a very large control error, thereby resulting in equipment failures and security risk.

SUMMARY OF THE INVENTION

In view of the above-described problems, it is one objective of the invention to provide an induced draft fan that has a more precise control, stable and reliable operation, reduced failures, and improved security.

To achieve the above objective, in accordance with one embodiment of the invention, there is provided an induced draft fan. The induced draft fan comprises: a housing, the housing comprising an air inlet, an air outlet, and an inner cavity; a wind wheel; an AC motor, the AC motor comprising a rotating shaft and a magnetic ring; and a controller, the controller comprising an AC-DC conversion circuit, a microprocessor, a Hall sensor, a drive circuit, and a relay. The rotating shaft comprises a front end part. The AC-DC conversion circuit comprises an input end and an output end. The relay comprises an input end and an output end. The inner cavity is used to accommodate the wind wheel. The air inlet and the air outlet communicate with the inner cavity. The AC motor is disposed on the housing. The front end part of the rotating shaft of the AC motor protrudes into the inner cavity and is connected to the wind wheel. The input end of the AC-DC conversion circuit is connected to an external AC input, and the output end of the AC-DC conversion circuit supplies a DC current to each circuit part. The input end of the relay is connected to the external AC input, and the output end of the relay supplies power for corresponding parts. The magnetic ring is disposed on the rotating shaft of the AC motor. The Hall sensor is disposed close to the magnetic ring for detecting a signal of a rotational speed of the AC motor and inputting the signal of the rotational speed into the microprocessor. The microprocessor controls energization or deenergization of the relay via the drive circuit.

In a class of this embodiment, the AC-DC conversion circuit, the microprocessor, the Hall sensor, the drive circuit, and the relay are integrated on a circuit board.

In a class of this embodiment, a rear end part of the rotating shaft of the AC motor protrudes from a rear end plate of the AC motor. The magnetic ring is mounted on the rear end part of the rotating shaft. A through hole is disposed at a center of the circuit board. The magnetic ring is disposed in the through hole.

In a class of this embodiment, a plurality of bolts protrude from an end face of the rear end plate of the AC motor. The bolts are mounted on the rear end plate of the AC motor via first nuts. The bolts pass through the circuit board for allowing the circuit board to be disposed on the first nuts.

In a class of this embodiment, a protecting shield is disposed outside the circuit board. The bolts pass through mounting holes arranged on the protecting shield and are locked by second nuts. The circuit board is pressed by the protecting shield.

In a class of this embodiment, the protecting shield is provided with a leading outlet, and a leading wire of the circuit board is led out from the leading outlet.

In a class of this embodiment, a set value of the rotational speed is input into the microprocessor via an I/O port for controlling the energization or deenergization of the relay.

In a class of this embodiment, the microprocessor is a micro control unit (MCU); and the Hall sensor is a Hall integrated circuit (IC) chip.

Advantages according to embodiments of the invention are summarized as follows:

1) The controller of the induced draft fan is employed that comprises the AC-DC conversion circuit, the microprocessor, the Hall sensor, the drive circuit, and the relay. The input end of the AC-DC conversion circuit is connected to the external AC input, and the output end of the AC-DC conversion circuit supplies the DC current to each circuit part. The input end of the relay is connected to the external AC input, and the output end of the relay supplies power for corresponding parts. The magnetic ring is disposed on the rotating shaft of the AC motor. The Hall sensor is disposed close to the magnetic ring for detecting the signal of the rotational speed of the AC motor and inputting such signal into the microprocessor. The microprocessor controls energization or deenergization of the relay via the drive circuit. Therefore, the control is more precise, the operation is more reliable and stable, the equipment failure is decreased, and the security is improved.

2) The rear end part of the rotating shaft of the AC motor protrudes from the rear end plate of the AC motor. The magnetic ring is mounted on the rear end part of the rotating shaft. The through hole is disposed at the center of the circuit board. The magnetic ring is disposed in the through hole. A plurality of bolts protrude from the end face of the rear end plate of the AC motor. The bolts are mounted on the rear end plate of the AC motor via first nuts. The bolts pass through the circuit board for allowing the circuit board to be disposed on the first nuts. The protecting shield is disposed outside the circuit board. The bolts pass through mounting holes arranged on the protecting shield and are locked by second nuts. The circuit board is pressed by the protecting shield. The above structure is simple, and the assembly thereof is convenient.

3) The protecting shield is provided with the leading outlet, and the leading wire of the circuit board is led out from the leading outlet, thereby being convenient for connection.

4) The set value of the rotational speed is input into the microprocessor via the I/O port for controlling the energization or deenergization of the relay, thereby being simple and convenient for regulation.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing an induced draft fan are described below. It should be noted that the following examples are intended to describe and not to limit the invention.

As shown in FIGS. 2-9, an induced draft fan comprises: a housing 1, a wind wheel 2, and an AC motor 3. The housing 1 comprises: an air inlet 11, an air outlet 12, and an inner cavity 13 for accommodating the wind wheel 2. The air inlet 11 and the air outlet 12 communicate with the inner cavity 13. The AC motor 3 is disposed on the housing 1. A front end part of the rotating shaft 31 of the AC motor 3 protrudes into the inner cavity 13 and is connected to the wind wheel 2. The induced draft fan further comprises a controller. The controller comprises an AC-DC conversion circuit, a microprocessor, a Hall sensor, a drive circuit, and a relay. An input end of the AC-DC conversion circuit is connected to an external AC input, and an output end of the AC-DC conversion circuit supplies a DC current to each circuit part. An input end of the relay is connected to the external AC input, and an output end of the relay supplies power for corresponding parts. A magnetic ring 32 is disposed on a rotating shaft 31 of the AC motor 3. The Hall sensor is disposed close to the magnetic ring 32 for detecting a signal of the rotational speed of the AC motor 3 and inputting the signal of the rotational speed into the microprocessor. The microprocessor controls the energization or deenergization of the relay via the drive circuit.

Figure 3:
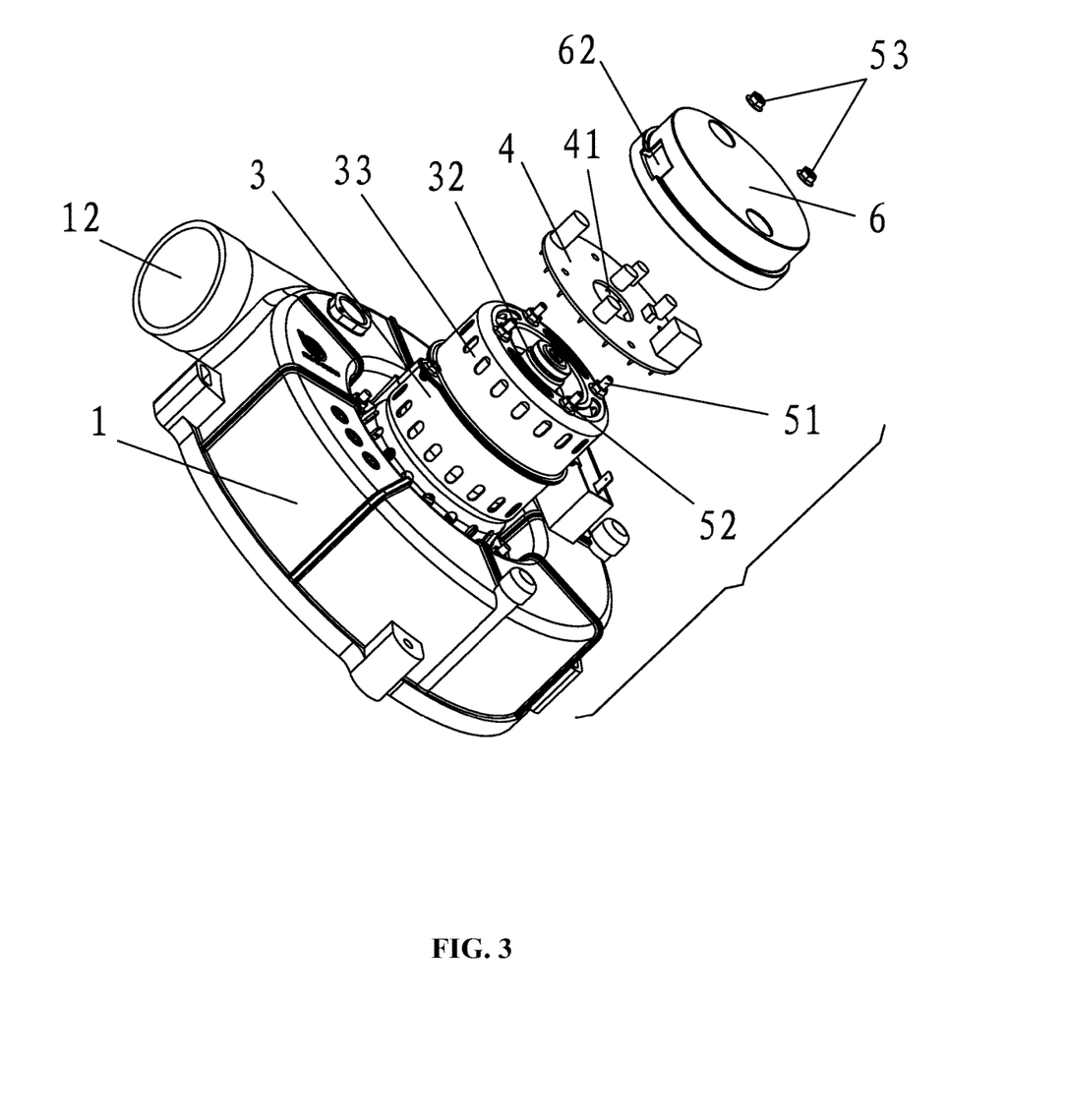
FIG. 3 is an exploded view of an induced draft fan in accordance with one embodiment of the invention.
Figure 4:
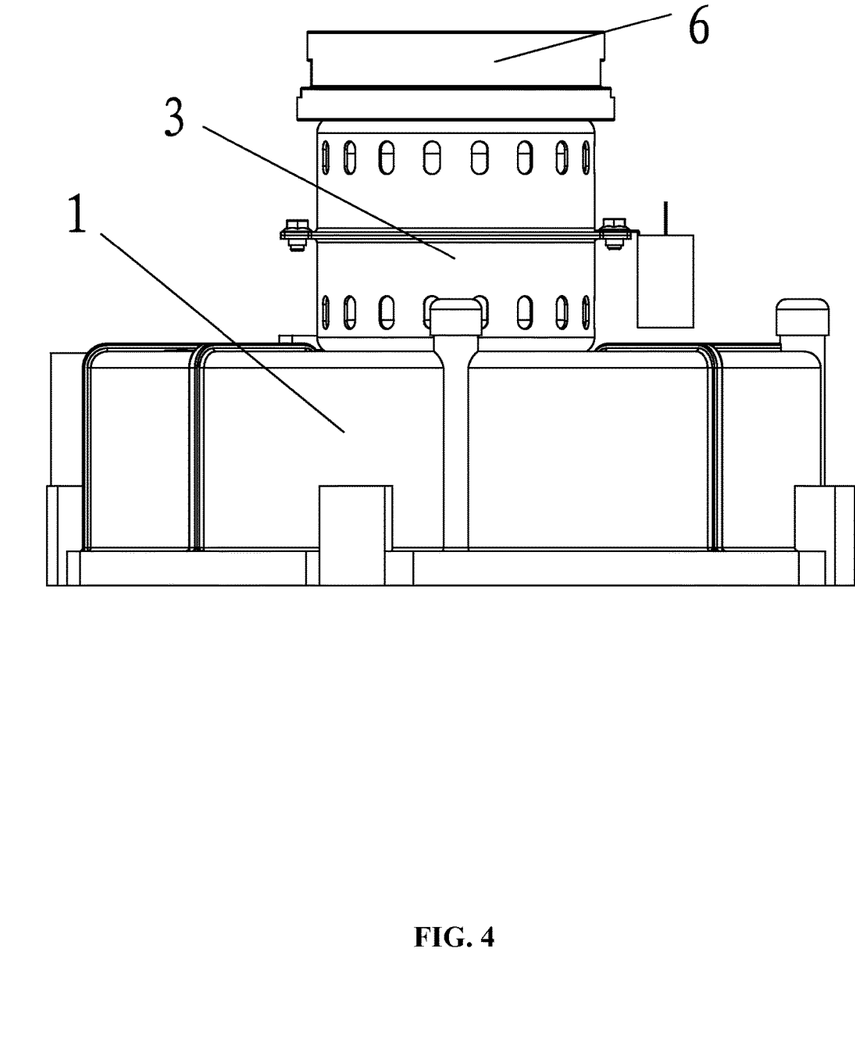
FIG. 4 is a lateral view of an induced draft fan in accordance with one embodiment of the invention.
Figure 5:
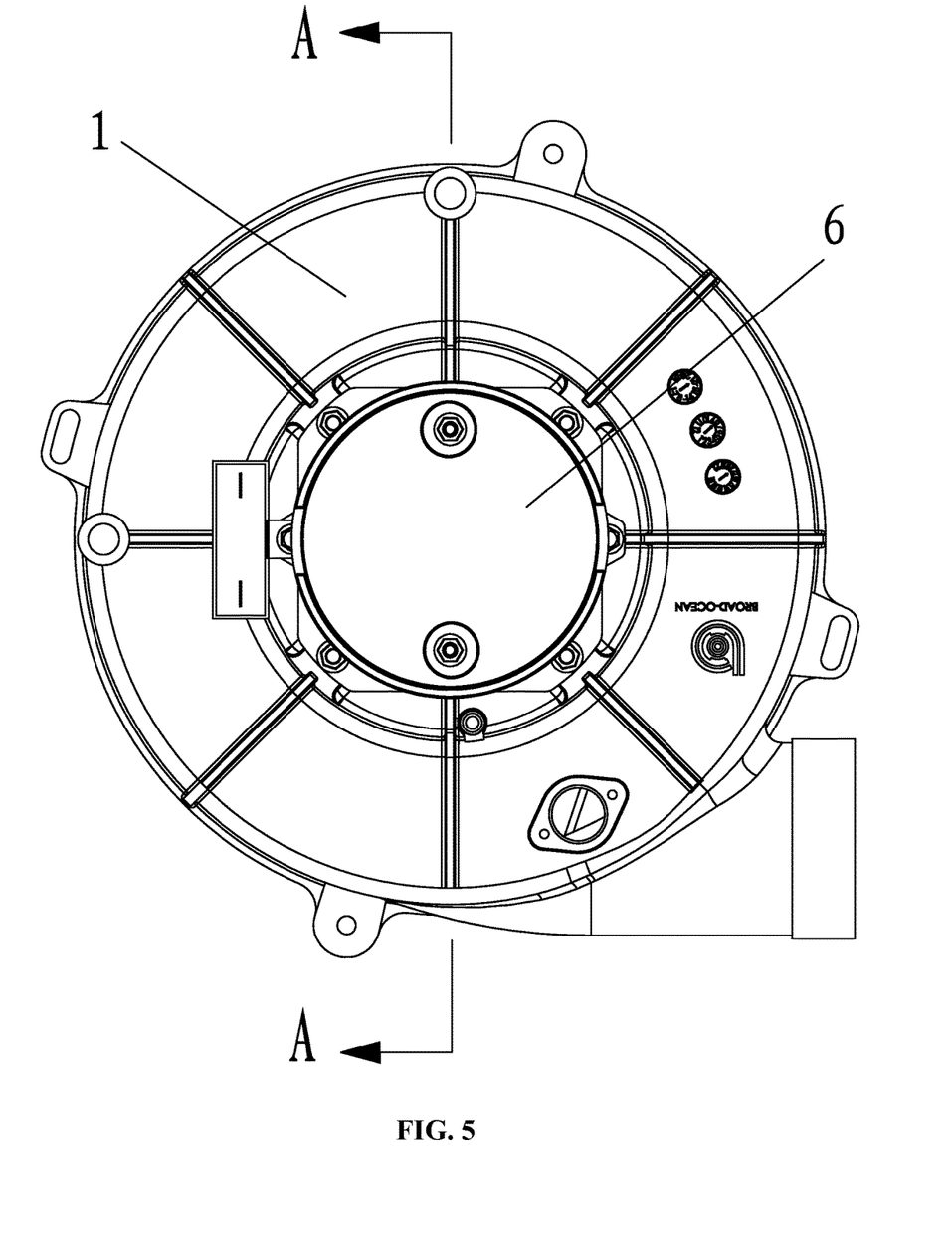
FIG. 5 is a top view of an induced draft fan in accordance with one embodiment of the invention.
Figure 6:
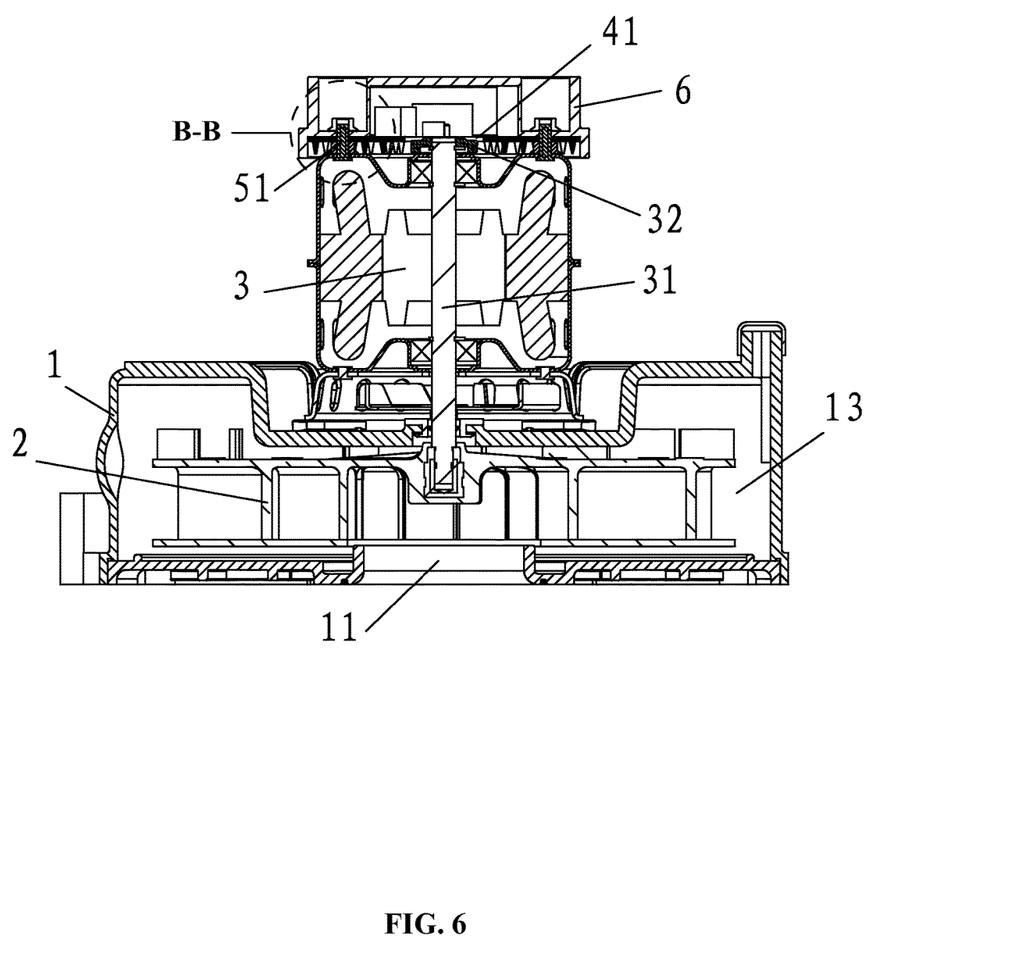
FIG. 6 is a cross-sectional view taken from line A-A of FIG. 5.
Figure 8:
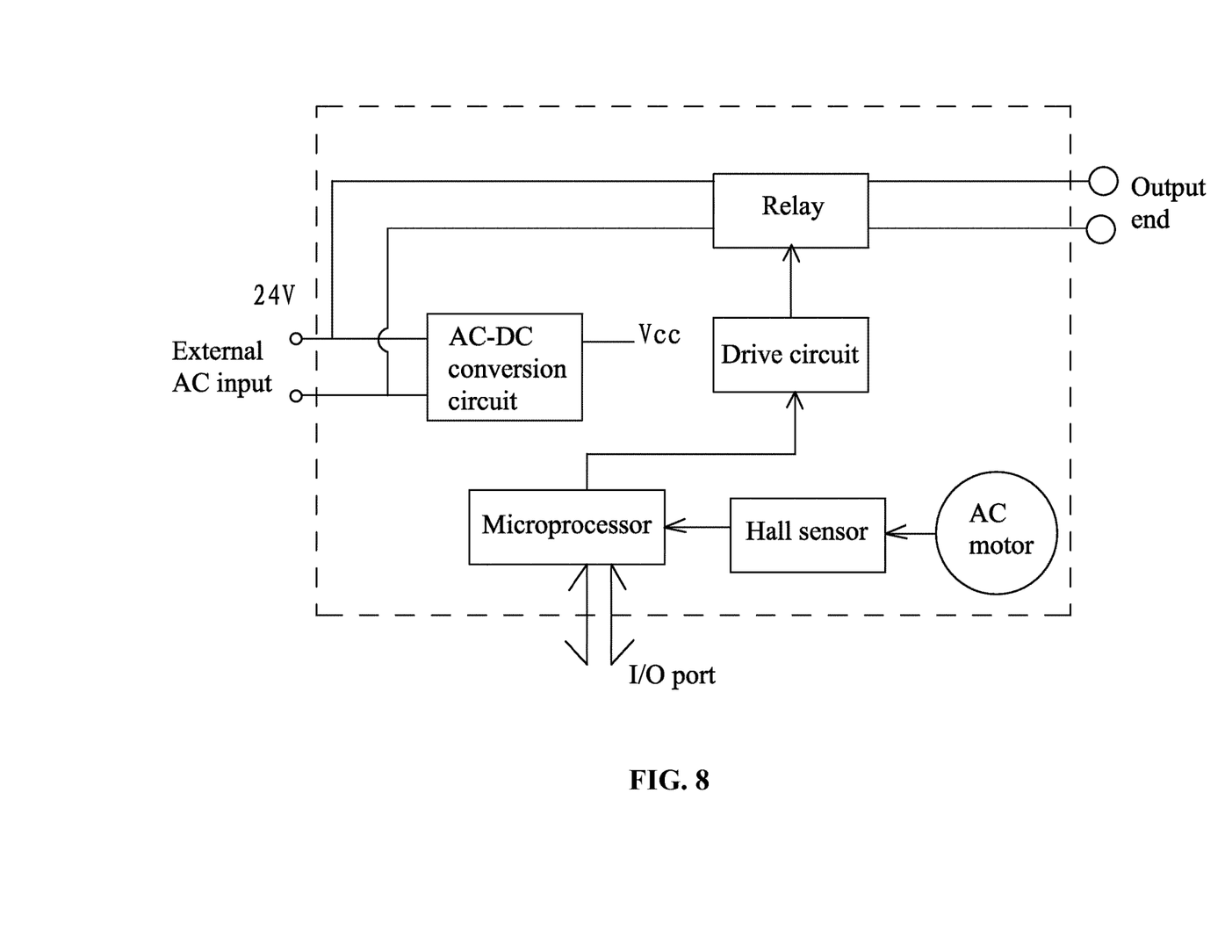
FIG. 8 is a first circuit block diagram of a controller of an induced draft fan in accordance with one embodiment of the invention.
Figure 9:
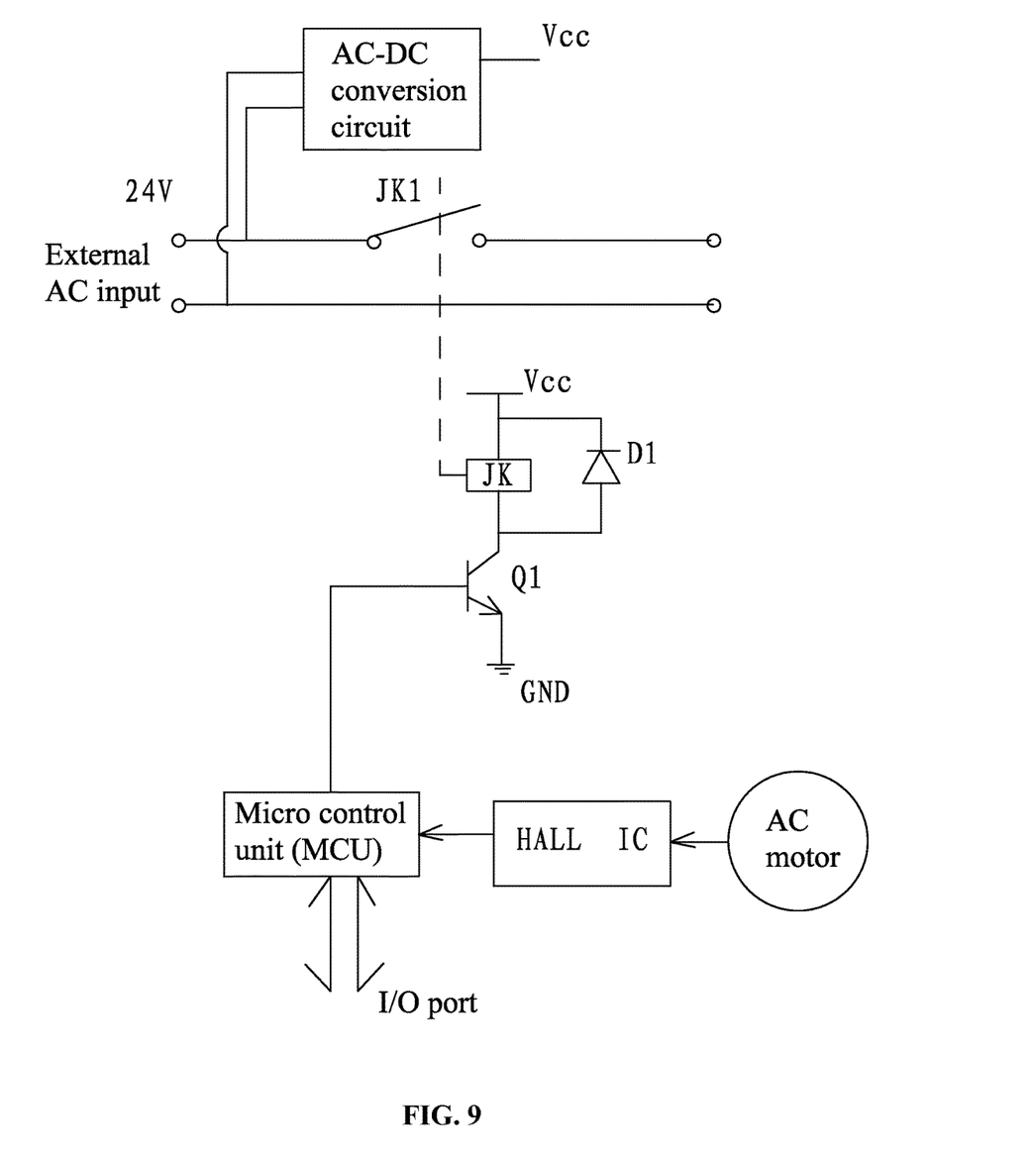
FIG. 9 is a second circuit block diagram of a controller of an induced draft fan in accordance with one embodiment of the invention.

The AC-DC conversion circuit, the microprocessor, the Hall sensor, the drive circuit, and the relay are integrated on a circuit board 4.

Figure 7:
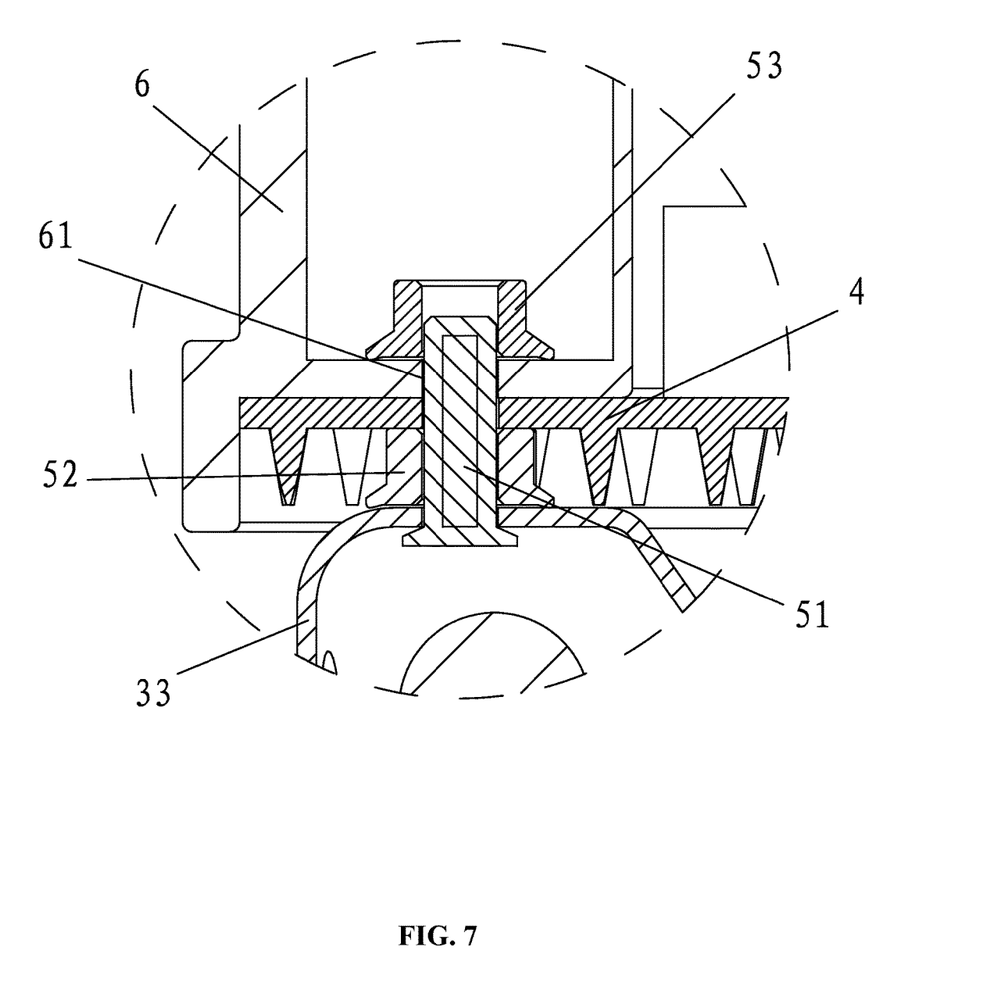
FIG. 7 is an enlarged view taken from part B-B of FIG. 6.

A rear end part of the rotating shaft 31 of the AC motor 3 protrudes from a rear end plate 33 of the AC motor 3. The magnetic ring 32 is mounted on the rear end part of the rotating shaft 31. A through hole 41 is disposed at a center of the circuit board 4. The magnetic ring 32 is disposed in the through hole 41.

A plurality of bolts 51 protrude from an end face of the rear end plate 33 of the AC motor 3. The bolts are mounted on the rear end plate 33 of the AC motor 3 via first nuts 52. The bolts 51 pass through the circuit board 4 for allowing the circuit board 4 to be disposed on the first nuts 52.

A protecting shield 6 is disposed outside the circuit board 4. The bolts 51 pass through mounting holes 61 arranged on the protecting shield 6 and are locked by second nuts 53. The circuit board 4 is pressed by the protecting shield 6.

The protecting shield 6 is provided with a leading outlet 62, and a leading wire of the circuit board 4 is led out from the leading outlet 62.

A set value of the rotational speed is input into the microprocessor via an I/O port for controlling the energization or deenergization of the relay.

The microprocessor is a micro control unit (MCU); and the Hall sensor is a Hall integrated circuit (IC) chip.

The relay comprises a relay coil JK and a relay switch JK1.

The drive circuit comprises a triode Q1 and a diode D1.

Principle of the induced draft fan according to embodiments of the invention is as follows: the set value of the rotational speed is input into the microprocessor via the I/O port, and the signal of the rotational speed of the AC motor 3 is detected by the Hall sensor and is input into the microprocessor. When the rotational speed of the AC motor 3 is lower than the set value, the relay switch JK1 connects under the control of the microprocessor via the drive circuit; and when the rotational speed of the AC motor 3 is higher than the set value, the relay switch JK1 disconnects under the control of the microprocessor via the drive circuit. The induced draft fan has a simple structure, precise control, stable and reliable operation, reduced failure, and improved security.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An induced draft fan, comprising:
   a) a housing, the housing comprising an air inlet, an air outlet, and an inner cavity;
   b) a wind wheel;
   c) an AC motor, the AC motor comprising a rotating shaft and a magnetic ring; the rotating shaft comprising a front end part; and
   d) a controller, the controller comprising an AC-DC conversion circuit, a microprocessor, a Hall sensor, a drive circuit, and a relay; the AC-DC conversion circuit comprising an input end; the microprocessor comprising a set value of the rotational speed; and the relay comprising an input end and an output end;

wherein:
   the inner cavity is used to accommodate the wind wheel;
   the air inlet and the air outlet communicate with the inner cavity;
   the AC motor is disposed on the housing;

the front end part of the rotating shaft of the AC motor protrudes into the inner cavity and is connected to the wind wheel;

the input end of the AC-DC conversion circuit is connected to an external AC input;

the input end of the relay is connected to the external AC input, and the output end of the relay supplies power to the AC motor;

the magnetic ring is disposed on the rotating shaft of the AC motor;

the Hall sensor is disposed close to the magnetic ring for detecting a rotational speed of the AC motor and inputting the rotational speed into the microprocessor; and the microprocessor controls the energization or deenergization of the relay via the drive circuit according to a difference between the rotational speed and the set value of the rotational speed, wherein the AC motor is respectively powered on and off by the energization and deenergization of the relay according to the rotational speed.

2. The induced draft fan of claim 1, wherein the AC-DC conversion circuit, the microprocessor, the Hall sensor, the drive circuit, and the relay are integrated on a circuit board.

3. The induced draft fan of claim 2, wherein
a rear end part of the rotating shaft of the AC motor protrudes from a rear end plate of the AC motor;
the magnetic ring is mounted on the rear end part of the rotating shaft;
a through hole is disposed at a center of the circuit board; and
the magnetic ring is disposed in the through hole.

4. The induced draft fan of claim 2, wherein
a plurality of bolts protrude from an end face of a rear end plate of the AC motor;
the bolts are mounted on the rear end plate of the AC motor via first nuts; and
the bolts pass through the circuit board for allowing the circuit board to be disposed on the first nuts.

5. The induced draft fan of claim 3, wherein
a plurality of bolts protrude from an end face of the rear end plate of the AC motor;
the bolts are mounted on the rear end plate of the AC motor via first nuts; and
the bolts pass through the circuit board for allowing the circuit board to be disposed on the first nuts.

6. The induced draft fan of claim 4, wherein
a protecting shield is disposed outside the circuit board;
the bolts pass through mounting holes arranged on the protecting shield and are locked by second nuts; and
the circuit board is pressed by the protecting shield.

7. The induced draft fan of claim 5, wherein
a protecting shield is disposed outside the circuit board;
the bolts pass through mounting holes arranged on the protecting shield and are locked by second nuts; and
the circuit board is pressed by the protecting shield.

8. The induced draft fan of claim 6, wherein the protecting shield is provided with a leading outlet, and a leading wire of the circuit board is led out from the leading outlet.

9. The induced draft fan of claim 7, wherein the protecting shield is provided with a leading outlet, and a leading wire of the circuit board is led out from the leading outlet.

10. The induced draft fan of claim 1, wherein a set value of the rotational speed is input into the microprocessor via an I/O port for controlling the energization or deenergization of the relay.

11. The induced draft fan of claim 2, wherein a set value of the rotational speed is input into the microprocessor via an I/O port for controlling the energization or deenergization of the relay.

12. The induced draft fan of claim 3, wherein a set value of the rotational speed is input into the microprocessor via an I/O port for controlling the energization or deenergization of the relay.

13. The induced draft fan of claim 1, wherein
the microprocessor is a micro control unit (MCU); and
the Hall sensor is a Hall integrated circuit (IC) chip.

14. The induced draft fan of claim 2, wherein
the microprocessor is an MCU; and
the Hall sensor is a Hall IC chip.

15. The induced draft fan of claim 3, wherein
the microprocessor is an MCU; and
the Hall sensor is a Hall IC chip.

16. The induced draft fan of claim 1, wherein when in use:
when the rotational speed is smaller than or equal to the set value of the rotational speed, the relay is energized and supplies power to the AC motor under control of the microprocessor; and
when the rotational speed is greater than the set value of the rotational speed, the relay is deenergized and disconnects power supply from the AC motor under control of the microprocessor.

* * * * *